US012031339B2

(12) United States Patent
Dvorak

(10) Patent No.: US 12,031,339 B2
(45) Date of Patent: Jul. 9, 2024

(54) JET ADAPTER FOR PLASTERING MACHINES

(71) Applicant: R.U.R. Czech a.s., Trest (CZ)

(72) Inventor: Zdeněk Dvorak, Cizov (CZ)

( * ) Notice: Subject to any disclaimer, the term of this patent is extended or adjusted under 35 U.S.C. 154(b) by 0 days.

(21) Appl. No.: 17/596,692

(22) PCT Filed: Jun. 17, 2020

(86) PCT No.: PCT/IB2020/055634

§ 371 (c)(1),
(2) Date: Dec. 16, 2021

(87) PCT Pub. No.: WO2020/254975

PCT Pub. Date: Dec. 24, 2020

(65) Prior Publication Data

US 2022/0220751 A1 Jul. 14, 2022

(30) Foreign Application Priority Data

Jun. 18, 2019 (CZ) ................................ CZ2019-386

(51) Int. Cl.
*B05B 7/04* (2006.01)
*B05B 7/08* (2006.01)
(Continued)

(52) U.S. Cl.
CPC ............ *E04F 21/12* (2013.01); *B05B 7/0483* (2013.01); *B05B 7/0884* (2013.01); *B05B 15/652* (2018.02); *B05B 15/658* (2018.02)

(58) Field of Classification Search
CPC ... B05B 7/0483; B05B 7/0884; B05B 15/652; B05B 15/658; E04F 21/12
See application file for complete search history.

(56) References Cited

U.S. PATENT DOCUMENTS

| | | | | |
|---|---|---|---|---|
| 1,945,298 A | | 1/1934 | Schmidt | |
| 4,530,468 A | | 7/1985 | Sperber | |
| 4,697,542 A | * | 10/1987 | Kohler | D21H 5/007 15/309.1 |

FOREIGN PATENT DOCUMENTS

| | | | | |
|---|---|---|---|---|
| CN | 101575904 A | | 11/2009 | |
| CN | 107386602 A | * | 11/2017 | E04F 21/08 |

(Continued)

OTHER PUBLICATIONS

Search Report, Industrial Property Office of the Czech Republic, issued Dec. 6, 2019.

(Continued)

*Primary Examiner* — Steven M Cernoch
(74) *Attorney, Agent, or Firm* — CIONCA IP Law P.C.

(57) ABSTRACT

A jet adapter (1) for plastering machines is designed for (semi)automatic application of materials, such as plaster, heat insulation foam, penetrating agent, etc. onto walls Thanks to its design, this unique jet adapter (1) in combination with a smart plastering machine is capable of plastering 1 m of a standard wall in 3 minutes, including plaster trowelling. The application of material onto the wall is performed by especially designed material jets (2) comprising a jet channel (22) and at least two gas feeds (24) entering the jet channel (22) at the slope ranging from 20° to 60° with reference to the axis of the jet (2), which feed the jet (2) with pressurized gas, that in the jet (2) accelerates the supplied material and provides it with energy sufficient for leaving the jet (2).

20 Claims, 14 Drawing Sheets

Figure 1:
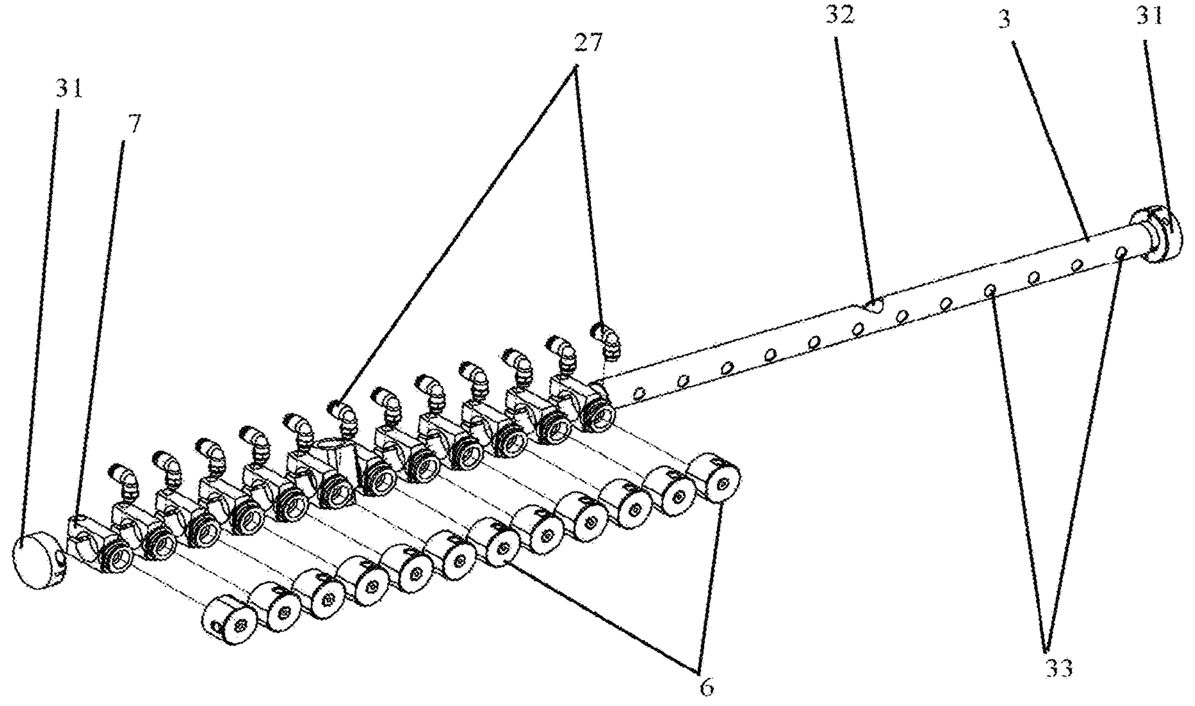

(51) Int. Cl.

| | |
|---|---|
| ***B05B 15/652*** | (2018.01) |
| ***B05B 15/658*** | (2018.01) |
| ***E04F 21/12*** | (2006.01) |

(56) References Cited

FOREIGN PATENT DOCUMENTS

| | | | | | |
|---|---|---|---|---|---|
| CS | 1988-3556 | A | | 7/1991 | |
| CS | 1988-3126 | B | | 9/1991 | |
| CS | 1988-6879 | A3 | | 9/1991 | |
| DE | 29702456 | U1 | | 6/1998 | |
| DE | 19705400 | A1 | * | 8/1998 | .............. E04F 21/12 |
| DE | 10226174 | A1 | | 1/2004 | |
| FR | 2758481 | A1 | * | 7/1998 | ............. B08B 15/04 |
| JP | 201056413 | A | | 4/2016 | |
| SU | 1423709 | A1 | * | 9/1988 | .............. E04F 21/12 |
| WO | WO-0036898 | A2 | * | 6/2000 | ............. B28C 5/026 |
| WO | WO 2003030228 | A2 | | 4/2003 | |

OTHER PUBLICATIONS

International Search Report, Patent Cooperation Treaty, completed Oct. 6, 2020, mailed Oct. 20, 2020.

* cited by examiner

JET ADAPTER FOR PLASTERING MACHINES

FIELD OF THE INVENTION

Constructions, automated plastering of walls, jet application of plaster.

STATE OF THE ART

Currently, a widespread method of plastering walls of smaller areas is manual plastering where plaster is applied onto the wall by manual throwing and where the plaster on the wall is also manually trowelled. A considerable disadvantage of manual plastering is its limitation by human factors where the quality is often proportionate to the experience of the pargeter. Another disadvantage is the speed of manual plastering that is on average about 25 minutes per 1 m2 of standard plaster with the thickness ranging from 5 to 10 mm, which also refers to the speed of manual plastering imposed by the applicable standard.

Another available solution is manual plastering using one jet, where plaster is applied onto the wall using an uncontrollable jet hose. Plaster is applied onto the wall unevenly depending on the experience of the operator, where the quality of the plaster depends not only on the quantity of plaster applied onto the wall but also on the distance of the jet hose from the wall during application. The plaster applied onto the wall is then manually trowelled and places with an insufficient layer of the applied plaster are replastered manually by throwing. In the case of manual jet plastering, the speed about 25 minutes per 1 $m^2$ of standard plaster with the thickness ranging from 5 to 10 mm is attained. Manual jet plastering is described, for example, in the document U.S. Pat. No. 5,878,921A (1995).

Another disadvantage of every manual plastering is the necessity to erect scaffolding for the walls, the height of which exceeds 2 m.

If we consider the current plastering machines, we discover that they have a number of disadvantages. One of the first plastering machines utilizing the principle of coating plaster onto the wall is described in the document U.S. Pat. No. 2,877,641A (1953). According to this document, the plastering machine is operated purely mechanically where plaster is coated onto the wall from a supply tank being gradually emptied using a system of ropes and reels. The machine is manually furnished to the wall to be plastered, set, and balanced. Another example is the much later Chinese plastering machine manufactured by HMC Machinery that is manually furnished to the wall to be plastered as well. It is necessary to install expanding stands positioned between the floor and ceiling near the wall to be plastered. It is also necessary to set a stop bar at the wall to be plastered along which the machine will be guided. The machine is equipped with a vibrational storage tank that is manually filled up with plaster. The storage tank is tilted towards the wall; it moves on the machine from the floor up to the ceiling. By gradual discharge of plaster from the storage tank, the plaster is pressed against the plastered wall by the vibrating storage tank. When the upper position—at the ceiling is reached, the storage tank is rebalanced, a wiping blade on the machine is folded down and the machine starts returning—from the ceiling to the floor while trowelling the applied/pressed-on layer of plaster on the wall. A considerable disadvantage of this solution is pressing plaster onto the wall while it has been proven that plaster performed by throwing or using a jet results in better cohesion of plaster to substrate compared to pressed-on plaster. The reason is that when plaster is pressed onto the wall without utilizing kinetic energy, air entrapped in the plaster is not expelled, which has negative effects on the cohesion of the plaster. Another disadvantage is the anchorage of the machine between the floor and the ceiling. This excludes the application of plaster onto, for example, exterior walls. Moreover, the ceiling as well as the floor must be strong enough to allow the expanding stands of the plastering machine to be installed. Another disadvantage is the reach of the plastering machine. Due to the storage tank, the machine cannot cover the height of the walls from the floor corresponding to the height of the storage tank. Therefore, a band at the bottom of the wall to be plastered remains without plaster applied. Moreover, the connection of individual bands of plaster is resolved manually again, i.e. by dismantling the machine on one site, its moving to another site, installing the expanding stands and resetting the stop bar, which provides an opportunity for inaccuracies between individually applied bans of plaster.

The plastering machines described in the documents KR101643551B1 (2015) or CN102817465A (2012) work on the principle of coating plaster onto the wall. However, even these machines have the aforementioned drawbacks, of which the most serious is the bad adhesion of plaster to the wall to be plastered due to the method of plaster application by coating.

As it was mentioned above, plaster can be applied onto the wall with the use of kinetic energy. Compared to plaster application by coating, this method guarantees much better adhesion of plaster to the wall and improvement in plaster quality. Plastering machines with pressurized plaster application onto the wall via a gap or via openings are described for example in the documents CN107190994A (2017), CN101575904B (2011) or U.S. Pat. No. 6,425,952B1 (2000).

From the point of view of plaster quality, the best method of plaster application onto the wall seems to be the utilization of kinetic energy—i.e. by throwing, pressurizing or using a jet. Plastering machines with a jet are described for example in the documents DE10226174A (2004) or CN202176099U (2012). However, it has been discovered that plaster cannot be pressurized more than at 4 MPa. When this limit is exceeded, the most of water is expelled from plaster and plaster immediately starts solidifying, which means that controlled application is no longer possible.

DESCRIPTION OF THE INVENTION

The subject of this invention is a unique jet adapter for a plastering machine that allows the application of material, in particular plaster, onto the wall with the use of kinetic energy by a set of especially designed non-pressure jets. When combined with a suitable plastering machine, the adapter is capable of application of 1 $m^2$ of standard plaster with the thickness ranging from 5 to 15 mm in approximately 3 minutes. Preferably, the adapter is installed on a smart plastering machine fitted with a driving unit and a set of measuring and monitoring devices that allow the plastering machine to work independently, in a nearly automatic manner.

The jet adapter for the plastering machine includes at least one closed hollow cylindrical bracket fitted with at least three jets with precisely defined mutual proportions of the cross-sections of all hollow components to ensure free, force-free movement of plaster. The output jetting of material from the jet adapter is provided by connecting gas into the stream of material in a precisely defined site of the last phase of movement.

Preferably, the jet adapter comprises at least one wiping blade, wherein the bracket as well as the wiping blade are positioned on a holder, where the holder is adapted to movable and dismountable mounting onto the guide of the plastering machine.

All components of the jet adapter have been developed to adapt to the resistance-free rolling lava-like movement of plaster and to allow plaster, being non-homogeneous material containing sand or other material, to be actually applied onto the wall using jets.

Therefore, the bracket is implemented in the form of a closed tube made of hard-wearing material, preferably stainless steel. The length of the bracket is shorter than 30 times the internal diameter of it and is on its ends closed by the bracket closure, preferably in a dismountable manner. The bracket is equipped with at least one material supply opening, through which plaster enters the bracket, and at least three jet openings, through which plaster is discharged from the bracket. The jet openings are arranged on the bracket along a single axis parallel to the longitudinal axis of the bracket. Preferably, the material supply opening is arranged opposite the jet openings. The material supply opening of the bracket is connected in a dismountable manner to a feed hose by which material is supplied to the bracket. The feed hose of the bracket is preferably connected to the material supply opening via a hose clamp.

Material is fed by the feed hose to the bracket via the material supply opening, rolls on through the bracket, fills up its volume and then oozes out of the bracket through jet openings into the jet channels of the jets and before the discharge opening of the jet channel, pressurized gas is supplied, mixes with material thus providing it with kinetic energy, and expels the material out of the jet under pressure.

The bracket is fitted with at least three jets that press against the jet openings of the bracket by their edge and are attached to the bracket. The jet opening in the bracket is preferably made with a rectangular protrusion where the edge of the jet fits into the protrusion. The outer diameter of the jets is larger than the diameter of the jet opening and smaller than the distance between the centres of the bracket jet openings. The number of jets on the bracket is limited only by the number of jet openings.

The jet is preferably attached to the bracket by seating in the jet clamp that embraces the bracket and the jet and holds the jet in its place. The clamp of the jet is preferably made as one piece to be put on the bracket and secured by at least one screw. Alternatively, the clamp of the jet is made of two components attached one to another in a dismountable manner and secured by at least two screws. The clamps of the jet have their external diameter smaller than the distance between the jet openings of the bracket. The jet clamp is preferably made of plastic material. The jet clamp is compatible with the jet case that is preferably made of plastic material. The jet clamp and the jet case are preferably fitted with a compatible thread. The jet clamp and the jet case are preferably fitted with functional internal space delimited by the jet clamp, the jet case and the jet cover. The internal space of the jet clamp is preferably fitted with a spring that expands the jet clamp and presses the jet against the jet case. Preferably, the internal space of the jet case and the jet clamp are supplied with pressurized air. The spring that presses the jet against the jet case seals the internal space and prevents the pressurized gas from escaping.

The jet body comprises one straight jet channel of the jet that extends in the centre of the jet, mates with the jet opening of the bracket thus providing connection for the internal space of the bracket and that of the jet channel, and at least two gas feeds entering the jet channel. The jet channel has the inlet diameter smaller than the diameter of the bracket jet opening and the sum of the areas of the cross sections of the jet channels is larger than the area of the cross section of the bracket inlet opening—or the sum of the areas of the bracket inlet openings. The diameter of the jet channel is selected according to the material roughness. Preferably, the jet channel has a constant diameter ranging from 3 to 8 mm along its entire length. The jet channel of each jet is fitted with at least two gas feeds, preferably arranged according to the rules of rotational symmetry, where the gas feeds are arranged in the jet body with a slope ranging from 20° to 60° with reference to the longitudinal axis of the jet channel, and/or with reference to the longitudinal axis of the jet, and the diameter of each feed is smaller than the diameter of the jet channel. Preferably, the gas feeds have the diameter ranging from 2 to 7 mm. The gas feeds open into the jet channel at the maximum distance corresponding to four times the diameter of the jet channel and at the minimum distance corresponding to 1.5 times the diameter of the jet channel in the place of the gas feed entry from the jet channel inlet opening. The distance of the gas feed entry into the channel set in this manner ensures that plaster will not solidify before its discharge from the jet and that the material is sufficiently accelerated thus allowing its spraying onto the wall. The gas feeds are connected to air tubing supplying pressurized gas to the gas feeds at the pressure of at least 0.3 MPa, preferably 0.8 MPa at the maximum. Pressurized air is preferably supplied into the internal space of the jet case from where it flows to the gas feeds. The jet body is made of hard-wearing material, preferably stainless steel.

The jet openings of the bracket that are not fitted with jets are closed by end caps, i.e. jet opening plugs in a dismountable manner. The jet opening plug has preferably the shape of a sleeve securable by a screw that embraces the bracket in the place of the jet opening thus closing it. In addition, the jet opening plug may have the shape of the jet clamp with an embedded end cap instead of a jet. Another option for blinding the jet opening is to install a jet with a blinded jet channel in it. Preferably, a blinding pin is inserted into the jet channel, where the blinding pin fills the whole jet channel thus preventing material from entering the jet space and blocking gas feeds on their entries into the jet channel. The blinding pin is preferably secured by a cap put on over the jet case.

Figure 11A:
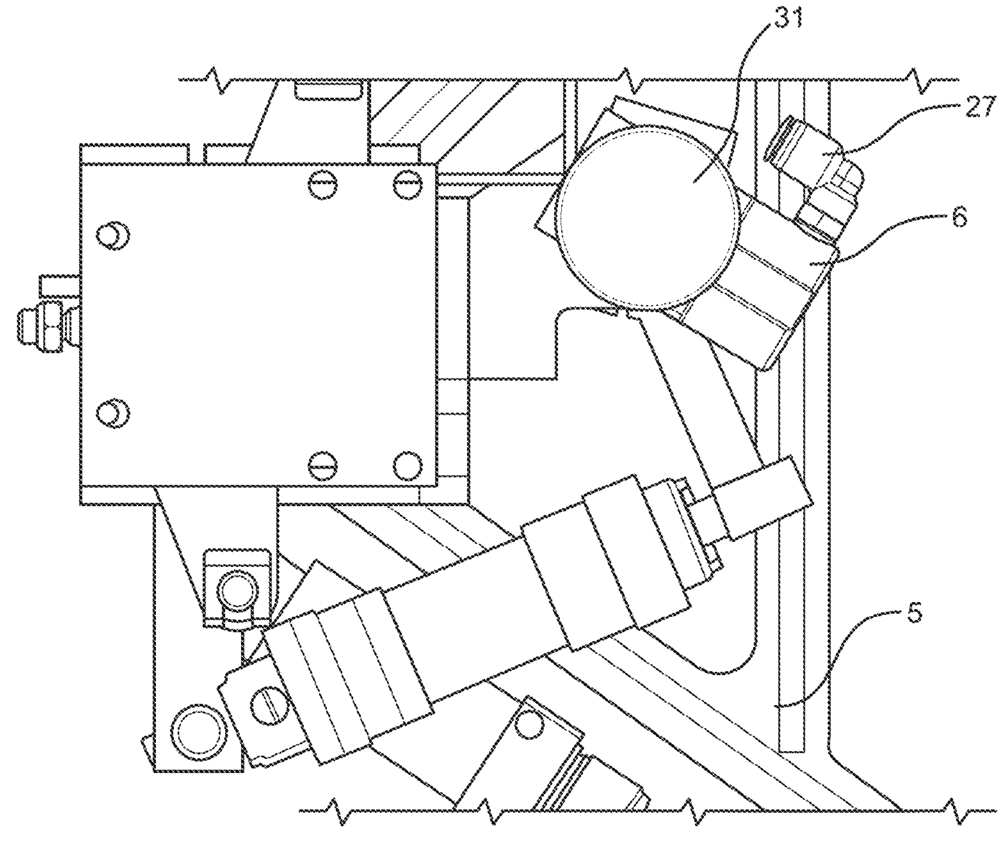

The bracket is installed in a holder of the jet adapter, which connects the bracket to the plastering machine in a dismountable manner and/or to the guide of the plastering machine. The guide is used to ensure the movement of the jet adapter in all directions, axes±x, y, and z, thus allowing the application of an exact dose of material in a given place of the wall, even if the wall is curved. The bracket is positioned in the holder in a movable and guidable manner in gliding pins. Preferably, guided pistons that control the slope of the bracket, or the slope of the jets respectively, are installed between the bracket and the holder. In zero position, the longitudinal axes of the jets are perpendicular to the wall to be plastered, meaning that the axis connecting the jet openings and the horizontal plane make the angel of 0° with the centre in the axis of the bracket; in the extreme side positions the axis connecting the jet openings and the horizontal plane make the angle up to ±60°, the centre of which is in the axis of the bracket. The slope of the bracket can be seen in FIGS. 11A, B, and C. The bracket is preferably such that can be slid to the sides, wherein the bracket installed in one or the other extreme position does not overlap, and/or the distance of the extreme positions of the bracket is at least double the length of the bracket. The jet adapter is capable of plastering two band of plaster without having to move the already installed plastering machine.

Preferably, the jet adapter has at last one wiping blade that is also fixed on the holder, preferably parallel to the bracket. The jet adapter has preferably two wiping blades where one of the wiping blades is positioned under the bracket and the other is positioned above the bracket. Preferably, the wiping blades are attached to the holder in a dismountable, movable, and guidable manner in gliding pins; guided pistons are preferably installed between the wiping blade and the holder to control the slope of the wiping blade. The blade rotates along the axis connecting the gliding pins. Preferably, the lower wiping blade is preferably tilted to allow the plaster to be trowelled in the bottom-up direction, meaning that the lower wiping blade and the horizontal plane make the angle of up to −60°, the apex of which is in the axis connecting both the sliding connections, and the upper wiping blade is tilted to trowel the plaster down from top, i.e. the upper wiping blade and the horizontal plane make the angle of up to +60°, the centre of which is in the axis connecting both the sliding connections. The slope of the wiping blades is shown in FIG. 11D. Thanks to the presence of two wiping blades it is possible to wipe and trowel the entire area of the wall to be plastered—both from the floor and from the ceiling. Preferably, the wiping blades are fitted with a vibrator.

All components of the jet adapter that come into contact with plaster or another plastering or filling material are preferably made of stainless steel and are also dismountable to allow material to be removed from the jet adapter after every use.

Preferably, the jet adapter is installed on a smart plastering machine that is fitted with wheels and is provided with measuring and monitoring devices by which the machine scans the surface of the wall to be plastered and works with it as with an alternative plane.

The plastering machine with a jet adapter in operation:

The following description shows a model situation of the fully automatic plastering machine fitted with a jet adapter with a holder, a bracket with two wiping blades positioned parallel to the bracket, where one wiping blade is positioned under the bracket and is designed for wiping material immediately after application onto the wall, while the other is positioned above the bracket and is designed for the calibration wiping of plaster and its trowelling. In the same manner it is possible to perform plastering of walls by a semi-automatic or manual plastering machine where all partial steps of the machine are controlled by the operator. In addition, it is necessary to realize that the application of plaster onto the wall by a plastering machine consists of at least two independent activities, namely the application of material onto the wall and plaster wiping or trowelling. These activities can be performed together—as described in the following model situation, or separately, where in one step material is applied onto the wall using the bracket fitted with jets and in the next step the plaster is wiped and trowelled by the wiping blade by either single trowelling—by the move of the wiping blade in only one direction, or by double trowelling—by the move of the wiping blade(s) in two directions, or completely manually.

The plastering machine is either manually or by a remote control approached to the wall and the required thickness of plaster and area of wall where the plaster is required are set on the machine and/or its monitoring device. The plastering machine maps the wall to which it has been approached using gauges, analyses the situation and moves automatically into the ideal position with reference to the wall to be plastered. The plastering machine equipped with a holder that is fitted with a bracket and two wiping blades sets the holder in the most cases to the lowest possible position, where the lower wiping blade nearly touches the floor, the bracket with jets is tilted and the axes of the jets point at the edge between the floor and the wall to be plastered. Then the plastering machine starts the plastering process when instructed by the operator.

Prior to starting feeding material—in the most cases plaster, heat insulation foam or penetrating agent—the compressed air feed is activated using the air tubing and the gas feeds into the jet channel. Then the material is supplied by a pump and then by a feed hose to the bracket via the material supply opening. Preferably, a worm pump with a preliminary screen, the mesh of which is smaller than the diameter of the jet channel, is used. Standard gear pumps for plaster feed have proven themselves as non-functional as plaster is subjected to excessive pressure and solidifies in the pump. Material is distributed to the jet openings and then to the jets by the bracket. In the jets and/or in the jet channels, the material is mixed with the flowing air and takes over its kinetic energy. The material is thus accelerated and flows out of the jets. The plastering machine controls the speed of the holder along the guide, the distance of the jets from the wall as well as the slope of the jets according to the preset required thickness of plaster and according to the roughness of a given wall. "Caterpillars" of material with their backs in the place of the jet mouth are applied onto the wall. The distance of individual backs of the caterpillars is the same as that of the jet openings of the bracket, and/or the mouths of the jets. It has been empirically verified that plaster is superior in quality if individual caterpillars are evenly shaped, their bodies low and slightly overlapping, meaning if the material is applied onto the wall with sufficient kinetic energy. This condition is attained by supplying pressurized gas into the jet channel by at least three gas feeds with the diameter of at least 3 mm. The caterpillars are applied onto the wall regardless of the movement of the jet adapter. With smooth plaster, it is advisable to move the jet adapter in the bottom-up direction; in the case that a bridge is to be created between the construction block and topping coat, it is advisable to move the jet adapter from one side to the other when moving in the bottom-up direction (or left to right or right to left). In this manner, zigzag caterpillars forming reliefs for better adhesion of the topping coat are created. When creating the bridge, plaster is not wiped by the wiping blade. Relief plasters can be used even without material wiping as a design element on for example exterior walls.

In addition, the plastering machine controls the contact pressure of the lower wiping blade to the plastered wall to ensure that plaster is wiped and its required thickness attained. After the plastering machine completes the entire height of the wall, the movement of the holder along the guide stops and while plastering, the jets are gradually tilted until they reach the edge between the plastered wall and ceiling, and/or until the axes of the jets pass through the edge between the plastered wall and ceiling.

Then the supply of material is stopped and after several seconds, usually 3 to 5, gas feed to the jets is stopped too. The upper wiping blade is approached to the plastered wall just under the ceiling and the plastering machine moves the holder along the guide downwards, while the contact pressure of the upper wiping blade is controlled by the machine based on the required thickness of the plaster. In this step, the plaster is trowelled and its thickness calibrated.

When the plastering machine applies plaster onto the band the width of which corresponds to the width of the bracket fitted with jets, either the bracket on the holder moves to the side, or the whole plastering machine moves and the process of plaster application and trowelling is repeated until the entire wall and/or the entire required area has been plastered. The individual steps, i.e. the application of material onto the wall and plaster trowelling can be performed in any direction or in any patterns. However, material is preferably applied by the movement of the holder fitted with the bracket in the bottom-up direction, and trowelling is preferably performed by the bottom-up and/or top-down movement.

SUMMARY OF PRESENTED DRAWINGS

Figure 2:
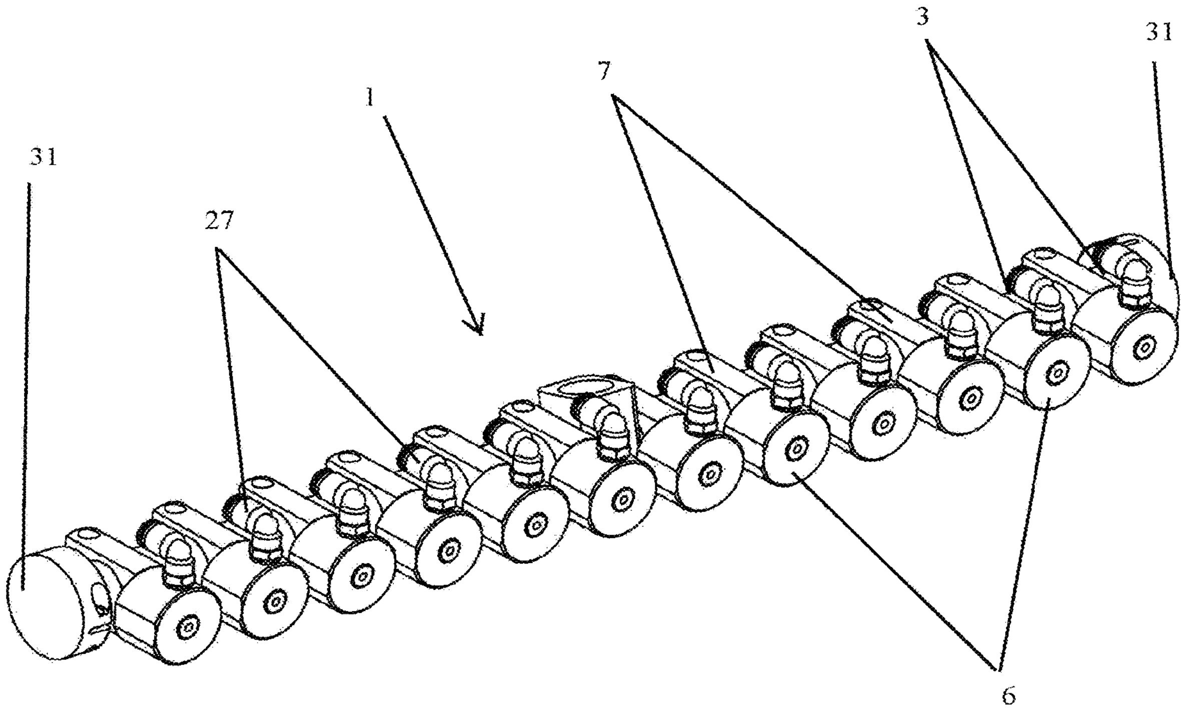
Figure 3:
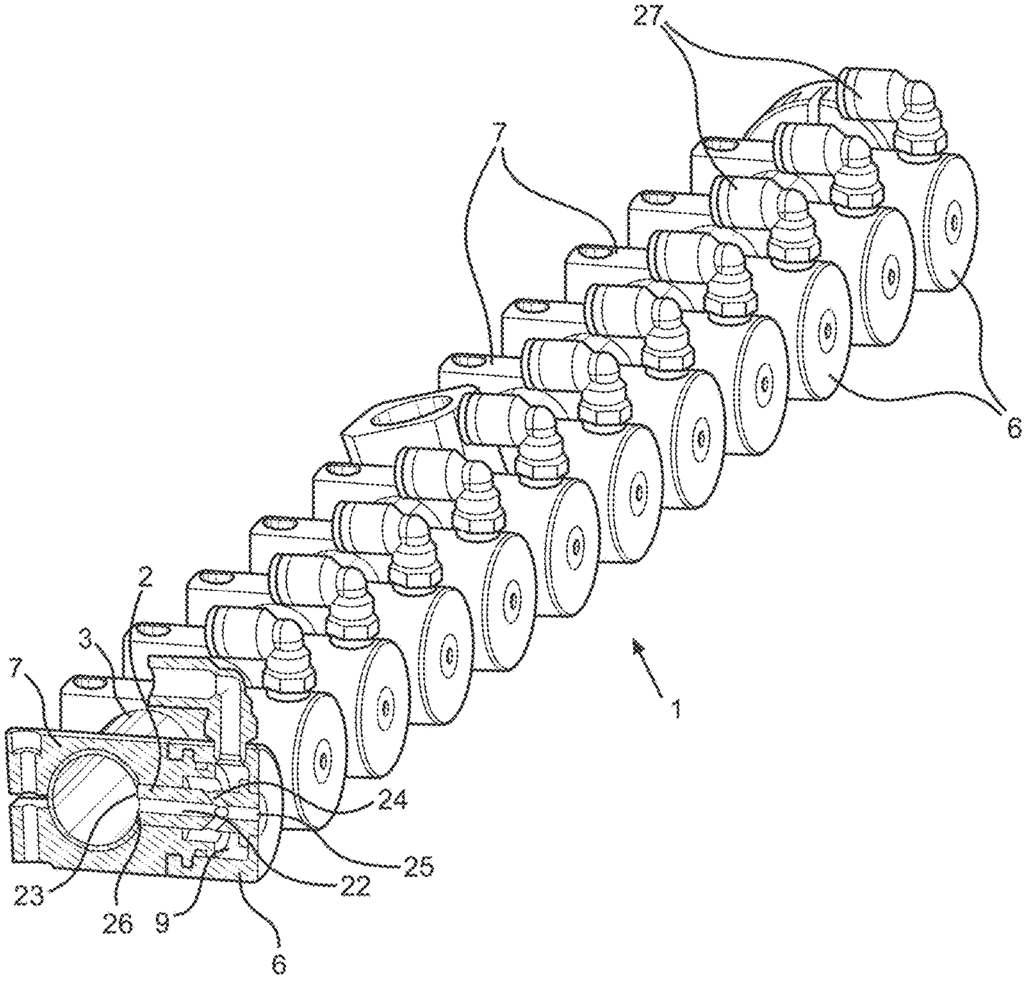
Figure 4:
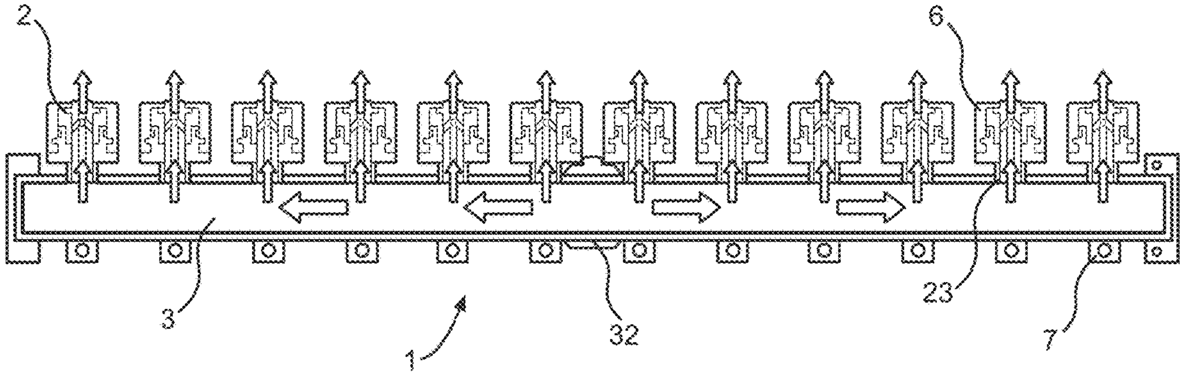

FIG. 1: The bracket of the jet adapter prepared for the installation of jet clamps and jet cases FIG. 2: The bracket of the jet adapter with the installed jets FIG. 3: Visualization of the bracket with the installed jets positioned in the jet clamp and the jet case fitted with components for pressurized gas feed FIG. 4: Illustration of the material flow through the bracket from the material supply opening to the jet openings, via the jets and out of the jets.

Figure 5:
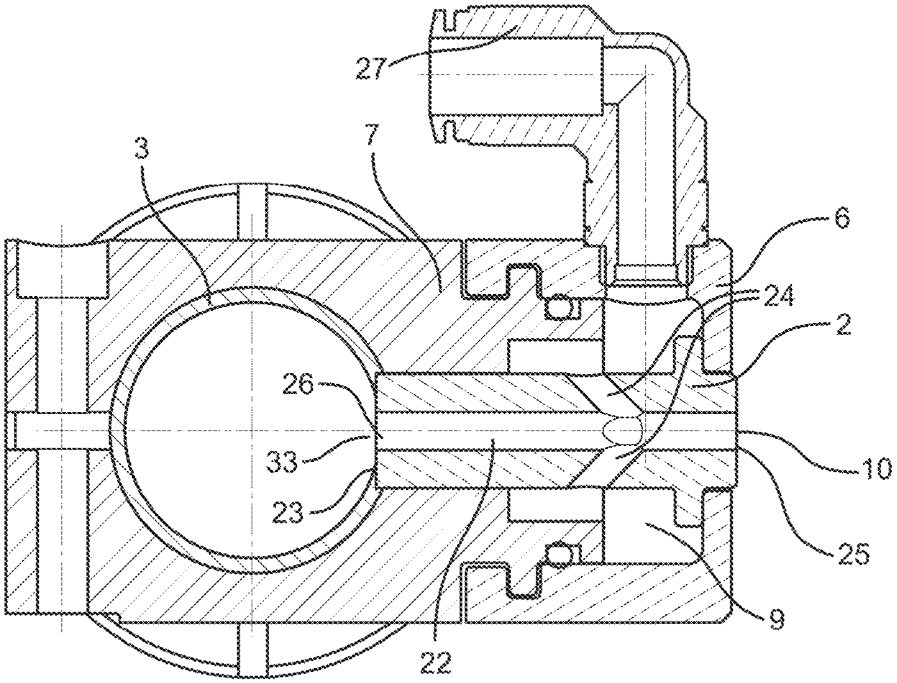

FIG. 5: The cross-section of the bracket with the installed jet and two gas feeds in the jet clamp and the jet case with a component for pressurized gas feed as per Example 2

Figure 6:
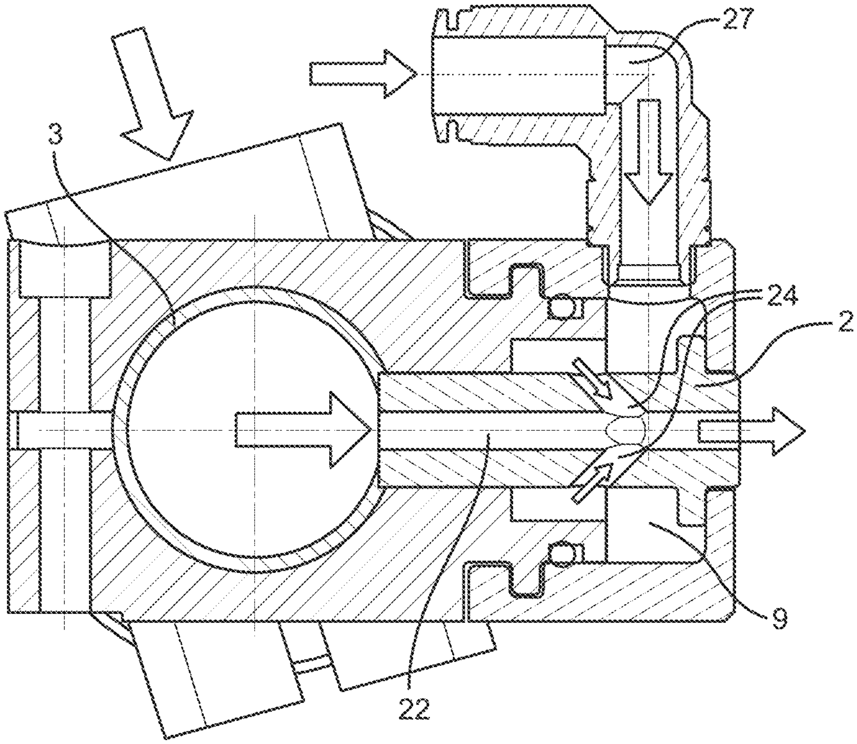
Figure 7:
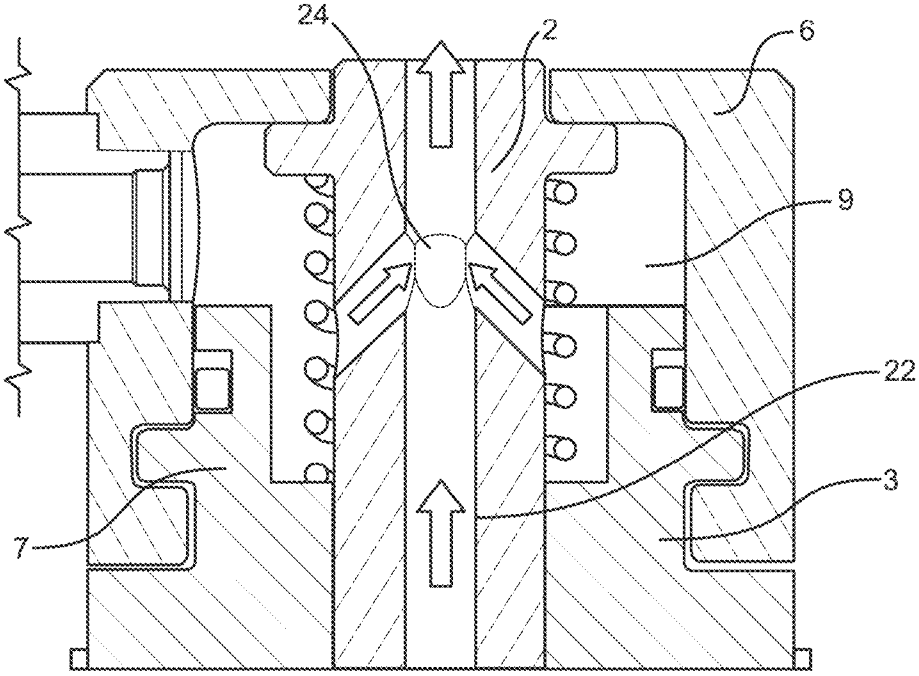

FIG. 6: Visualization of the cross-section of the bracket with the installed jet and two gas feeds seated in the jet clamp and the jet case with a component for pressurized gas feed FIG. 7: Illustration of the material flow (detail)

Figure 8:
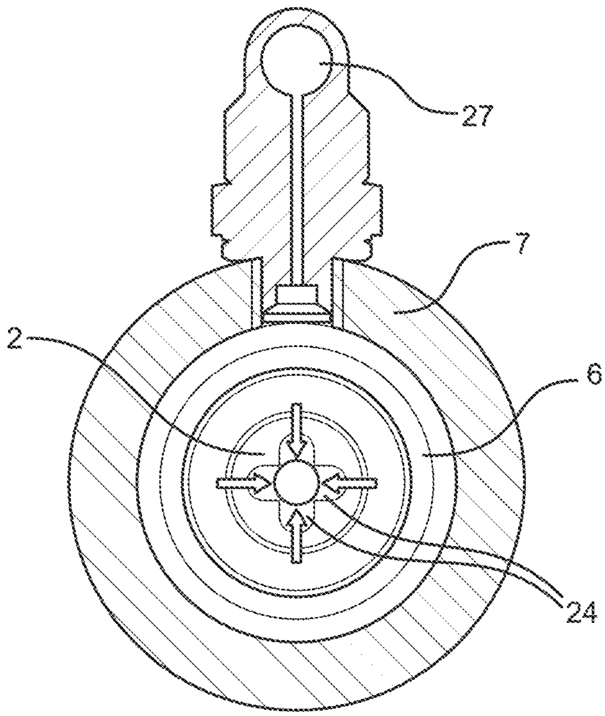
Figure 9A:
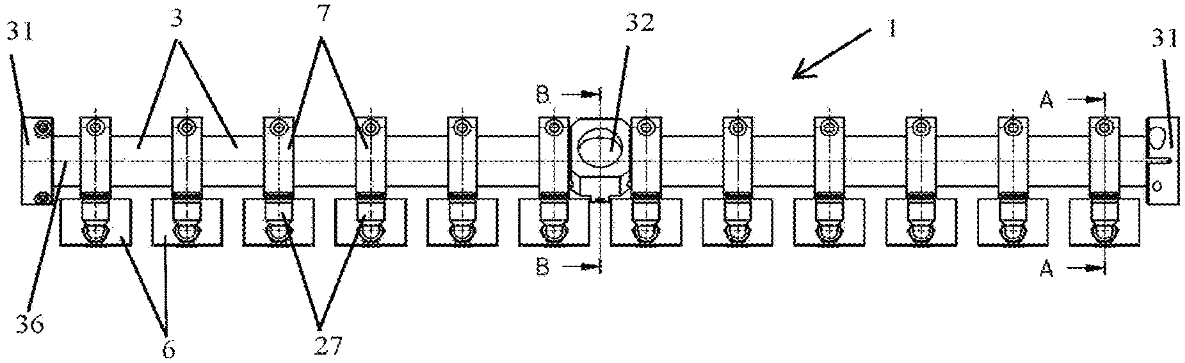
Figure 9B:
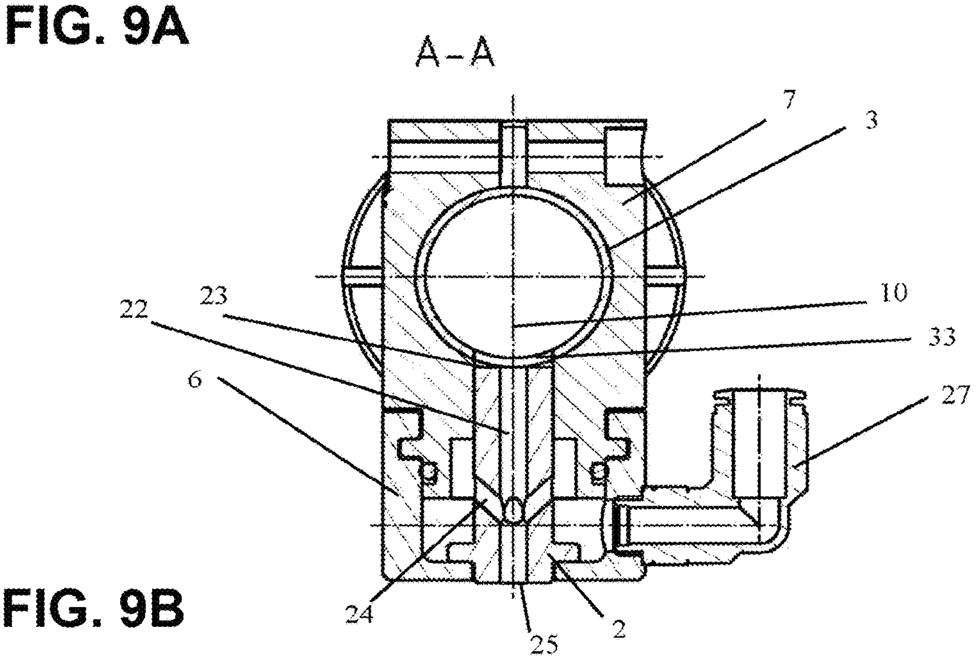
Figure 9C:
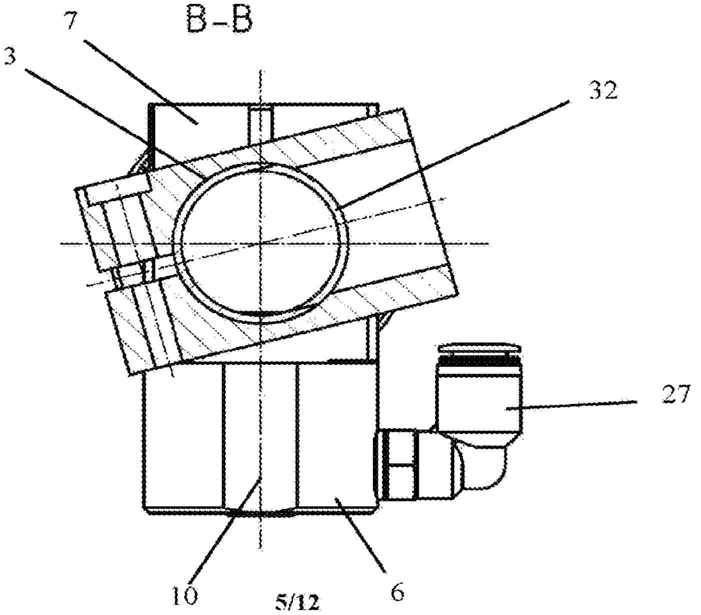
Figure 10A:
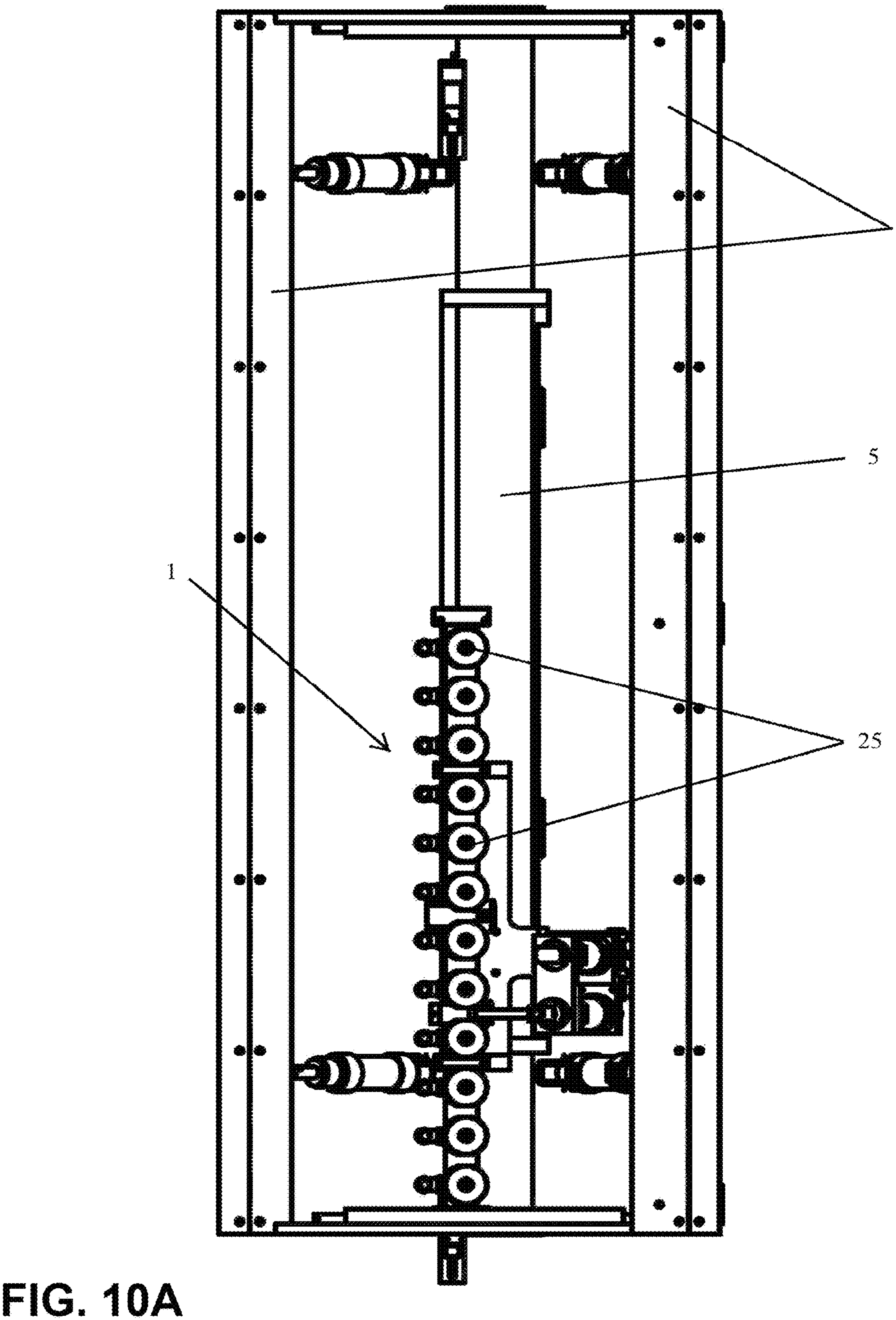
Figure 10B:
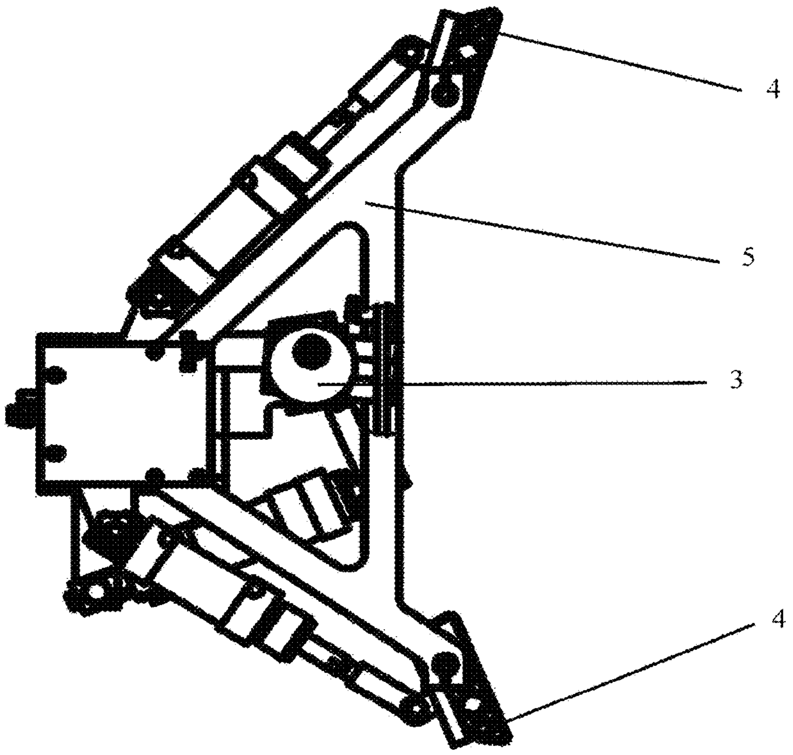
Figure 10C:
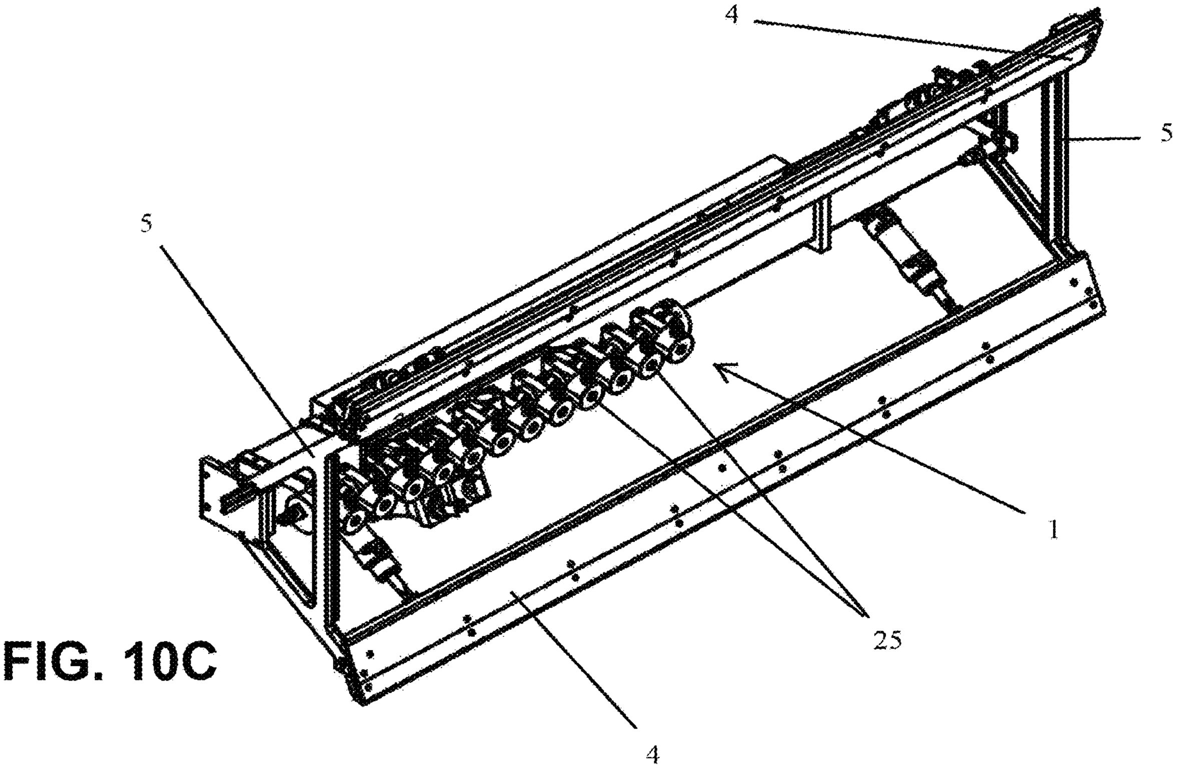
Figure 10D:
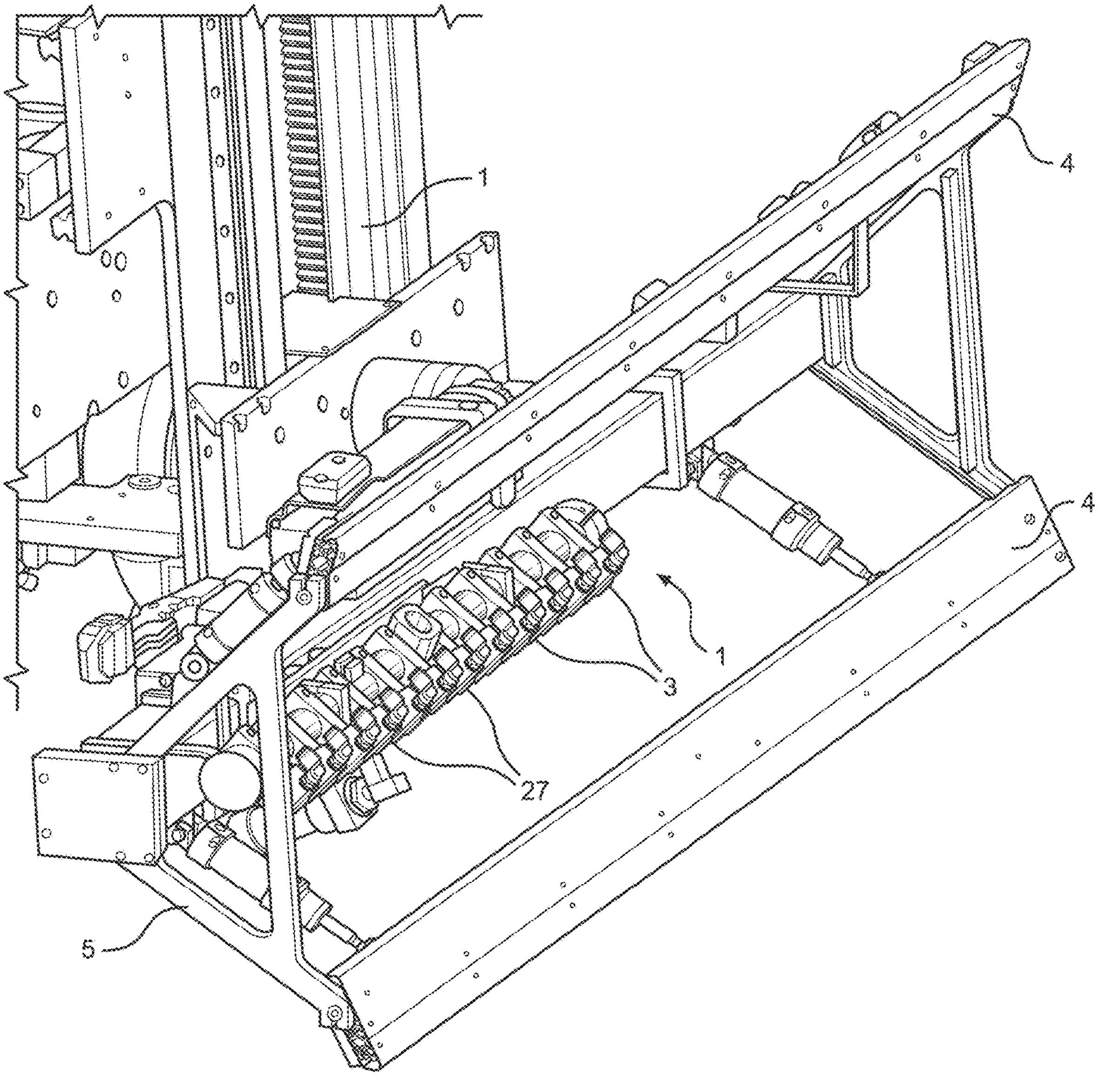

FIG. 8: Visualization of the cross-section of the jet with four gas feeds in the jet clamp and the jet case with a component for pressurized gas feed FIG. 9A: The bracket of the jet adapter with the installed jets FIG. 9B: The bracket of the jet adapter with the installed jets, the A-A section FIG. 9C: The bracket of the jet adapter with the installed jets, the B-B section FIG. 10A: The jet adapter with two wiping blades and the bracket fitted with twelve jets, front view FIG. 10B: The jet adapter with two wiping blades and the bracket fitted with jets, side view FIG. 10C: The jet adapter with two wiping blades and the bracket fitted with twelve jets, side front view FIG. 10D: Visualization of the installation of the jet adapter onto the guide of the plastering machine FIG. 11A: Visualization of the piston-guided slope of the bracket with the fitted jets, position −30°

Figure 11B:
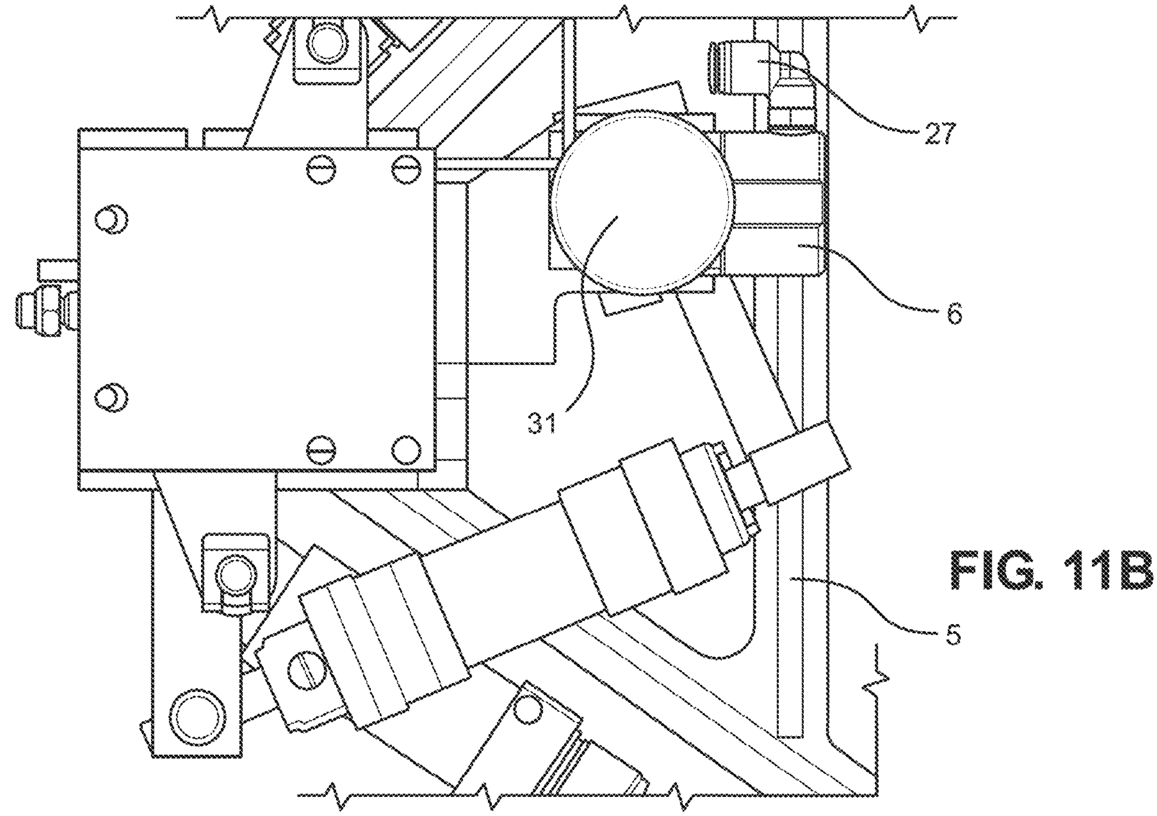
Figure 11C:
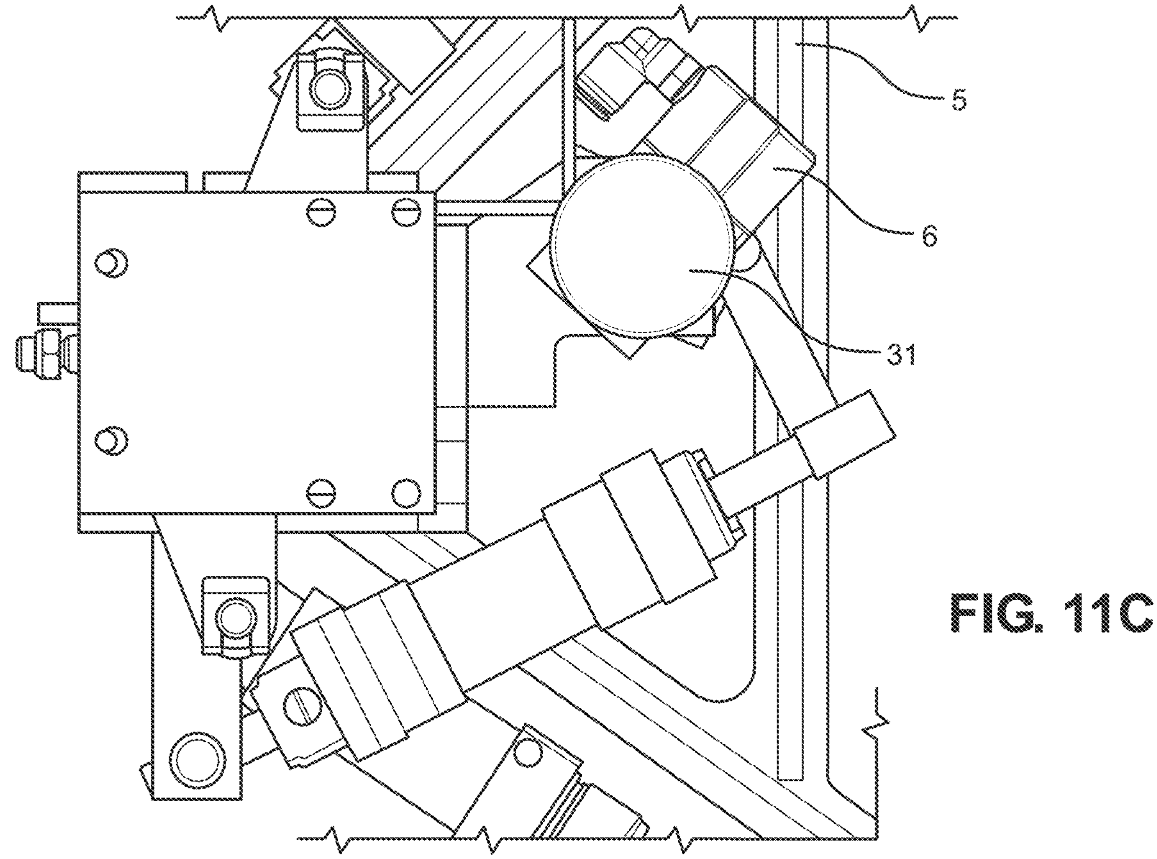
Figure 11D:
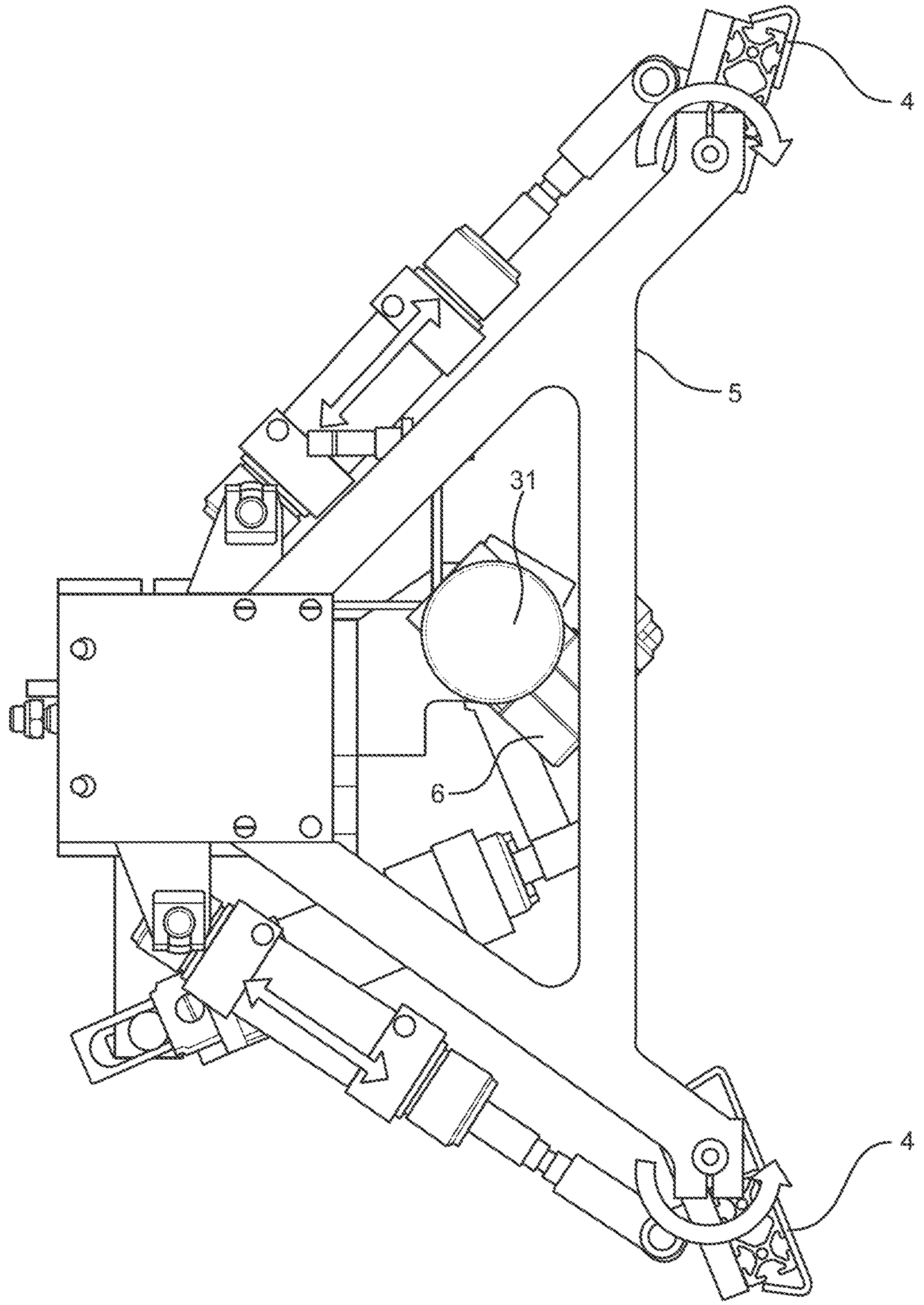

FIG. 11B: Visualization of the piston-guided slope of the bracket with the fitted jets, horizontal position FIG. 11C: Visualization of the piston-guided slope of the bracket with the fitted jets, position +50°

Figure 12:
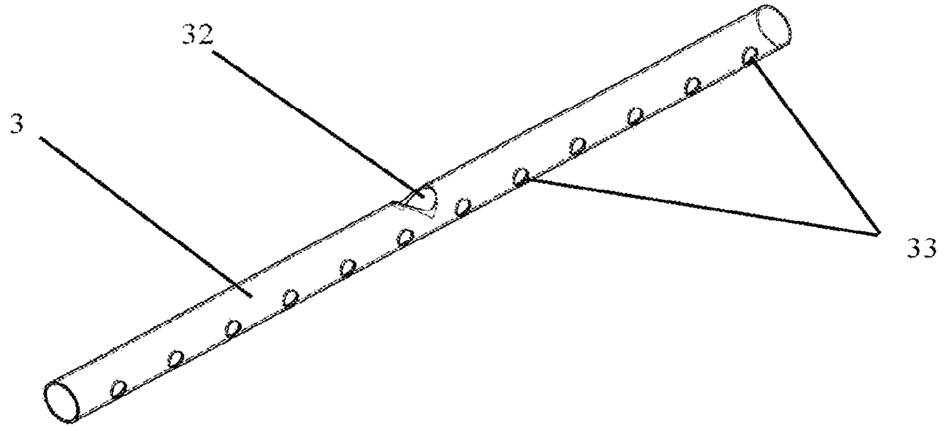
Figure 13:
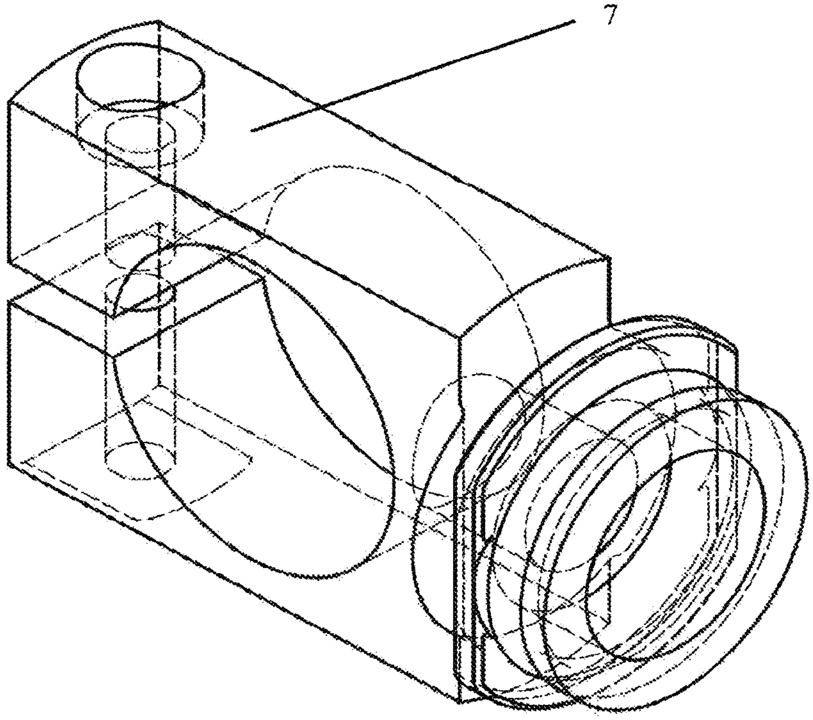
Figure 14:
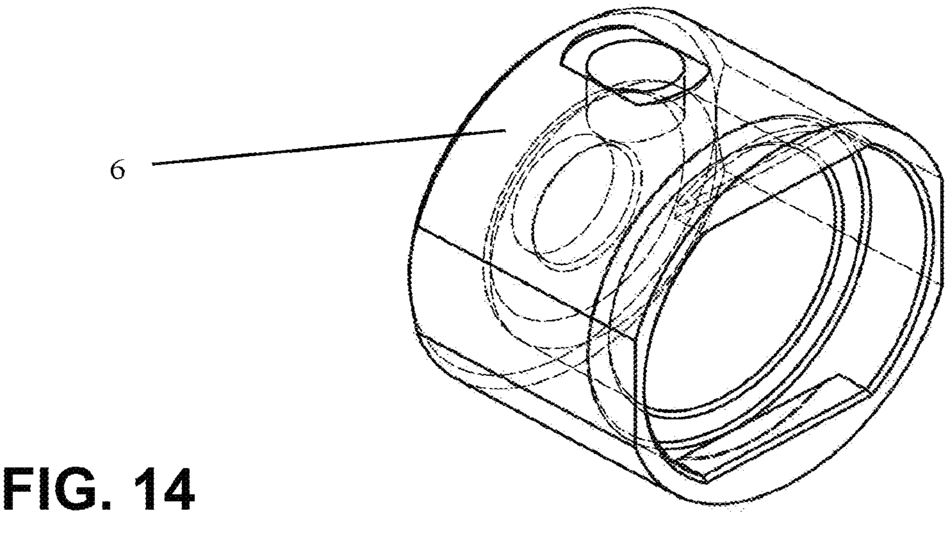
Figure 15A:
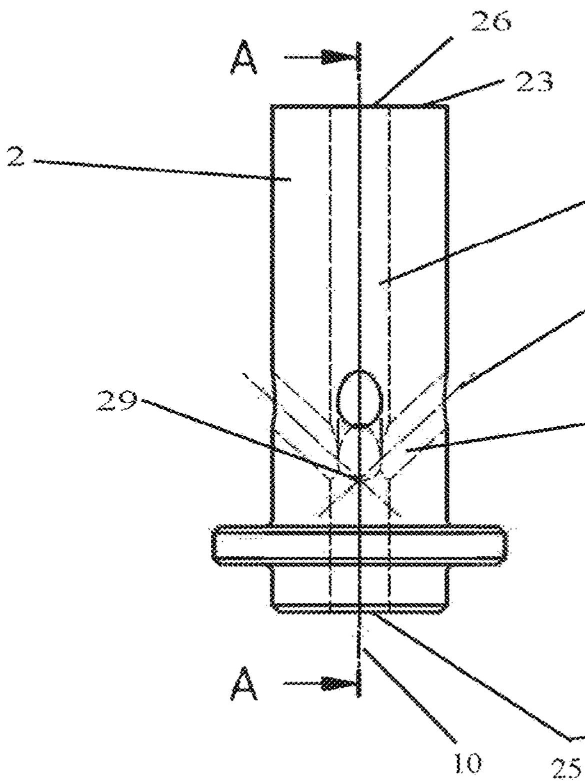
Figure 15B:
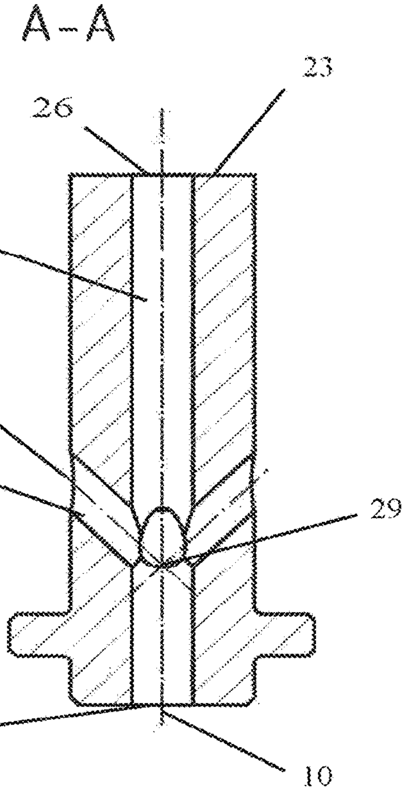
Figure 15C:
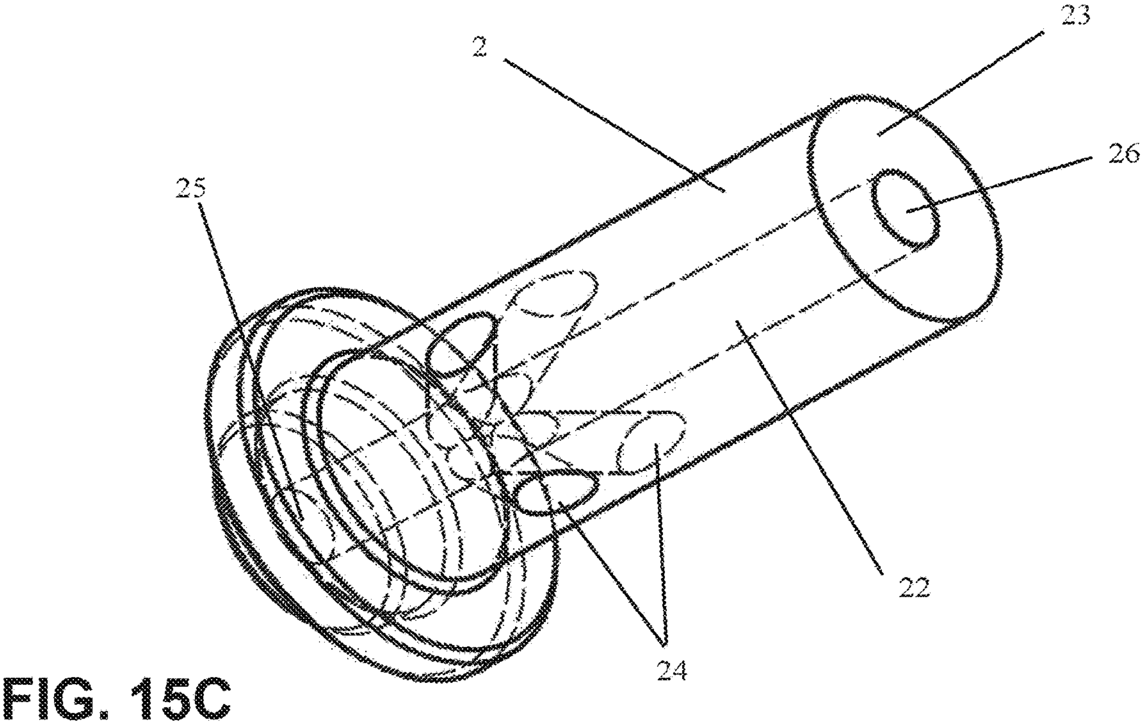

FIG. 11D: Visualization of the jet adapter with the piston-guidable wiping blades, side view FIG. 12: The bracket without plugs, with twelve jet openings and one material supply opening FIG. 13: Jet clamps FIG. 14: Jet case FIG. 15A: The jet with four gas feeds, side view FIG. 15B: The cross-section of the jet as per FIG. 15A FIG. 15C: The jet with four gas feeds, side bottom view from the edge of the jet

EXAMPLES OF INVENTION EXECUTION

Example 1A a Minimal Jet Adapter, for Example for a Manually Operated Plastering Machine The bracket 3 of the jet adapter 1 is installed in the holder 5 and has the diameter of 20 mm and the length of 600 mm and is fitted with one material supply opening 32 of the diameter of 8 mm and four jet openings 33 with the diameters of 10 mm situated on the opposite side of the bracket 3. The material supply opening 32 of the bracket 3 is connected to the feed hose 35 with the diameter of 8 mm. Three jet openings 33 are fitted with three jets 2 and one jet opening 33 is blinded by a plug of the jet opening 33. The jets 2 have the external diameters of 12 mm, follow the jet openings 33 and are installed in the plastic clamps 7 of the jets 2 secured by a screw keeping the jet 2 in its place, and are secured by the cases 6 of the jets 2 fixing the jets 2 pressed onto the jet openings 33. Each jet 2 has one longitudinally arranged through-going jet channel 22 with the diameter of 3 mm and two gas feeds 24 arranged in accordance with the rules of rotational symmetry, with the diameter of 2 mm, tilted with reference to the longitudinal axis 10 of the jet 2 by 20°, wherein the intersection 29 of their axes 28 is at the distance of 4.5 mm from the discharge opening 25 of the jet channel 22. The gas feeds 24 are led out from the clamp 7 of the jet 2 and connected directly to the feed pipe 27, being air tubing that supply the system with air at the pressure of 0.3 MPa.

Example 1B A Manually Controlled Plastering Machine with the Minimum Jet Adapter A wheeled plastering machine fitted with a drive, a guide to which the jet adapter 1 as per Example 1A is attached in a movable and dismountable manner; the plastering machine is positioned to the wall; here the machine is levelled manually using a level by the levelling feet to be in a plane perpendicular to the plane where plaster is to be applied. Depending on the thickness of the planned plaster (5 mm) and the material flow rate through the plastering machine (30 l/min), the required speed of the holder 5 with the bracket 3 (30 mm/s) is calculated. This speed is set on the plastering machine. The longitudinal axis 10 of the jets 2 is perpendicular to the plastered wall. The holder 5 with the bracket 3 and the jets 2 is suspended to the lowest position of the machine where the longitudinal axes 10 of the jets 2 cross the plane of the plastered wall at the maximum 5 cm above the floor, and/or above the edge of the plastered area. Then the feed of pressurized gas set at 0.4 MPa to the jet channel 22 of the jet 2 is activated and so is the supply of material from the source—which may be a cistern fitted with a pump or mixing equipment with a pump—to the feed hose 35 at the speed of 30 l/min. The material is supplied by the feed hose 35 to the bracket 3, along which it is distributed to the jets 2; the material passes the jet channels 22 of the jets 2, is accelerated by the flowing pressurized air coming through the gas feeds 24 to the gas channel 22 and leaves the jet 2. At this moment, the movement of the holder 5 with the bracket 3 and jets 2 is activated at the required speed. The material is applied onto the wall from the floor towards the ceiling. The movement of the holder 5 with the bracket 3 and the jets 2 is stopped at the highest position of the machine where the longitudinal axes 10 of the jets 2 cross the plastered wall at the maximum 5 cm under the ceiling, and/or under the edge of the plastered area. The supply of material is deactivated and immediately after that the pressurized gas feed is deactivated too. In this way, it takes 65 s to apply plaster onto the area of 1 $m^2$ of the wall. Then the plaster is either manually trowelled or the holder 5 with the bracket 3 and the jets 2 is dismantled from the plastering machine and a wiping blade 4 is attached to the guide of the plastering machine in a movable and dismountable manner. The plastering machine is installed again in the required position, the wiping blade 4 is manually set at the slope of −40° with reference to the horizontal plane, locked in the position and arranged at the bottom edge of the plastered area. The movement of the wiping blade 4 along the guide is activated in the bottom-up direction and the wiping blade 4 wipes the material applied onto the wall. In the upper position the movement of the wiping blade 4 stops. It is possible to tilt the wiping blade 4 to the slope of +40° with reference to the horizontal plane and repeat plaster trowelling similarly in the top-down direction.

When the entire band of plaster is wiped and trowelled, the machine is rearranged to allow the following band to follow the already plastered area and the whole process is repeated until the required area has been completed. For this reason it is preferred if the bracket 3 is fitted with the highest possible number of the jets 2 to plaster the largest possible area of the wall during one cycle.

Example 2A The Jet Adapter Fully Equipped, for Example for Fully Automatic Plastering Machine The jet adapter 1 is fitted with a holder 5 with the bracket 3 mounted in a movable and dismountable manner. The length of the holder 5 is twice the length of that of the bracket 3 and is fitted with a movable system for the bracket 3, which can move within the holder 5 from one side to the other in a controlled manner. In addition, the holder 5 is fitted with two wiping blades 4 attached in a movable and dismountable manner, wherein the length of the wiping blades 4 is the same or smaller than that of the bracket 3 and the same or smaller than that of the holder 5. Between the bracket 3 and the holder 5 and also between the wiping blades 4 and the holder 5, guided pistons controlling the slope of the bracket 3, and/or the slope of the jets 2 and the slope of the wiping blades 4 are mounted. The bracket 3 has the diameter of 27 mm and the length of 620 mm and is fitted with one material supply opening 32 of the diameter of 27 mm and twelve jet openings 33 with the diameters of 12 mm at constant distances along the bracket 3. The material supply opening 32 of the bracket 3 is connected to the feed hose 35 with the internal diameter of 30 mm, which supplies material to the bracket 3 at the speed of 35 l/min. All jet openings 33 are fitted with jets 2. The jets 2 have the external diameters of 12 mm, follow the jet openings 33 and are installed in the plastic clamps 7 of the jets 2 secured by a screw, which keep the jets 2 in their places, and the jets 2 are also secured by the cases 6 of the jets 2 fixing the jets 2 pressed against the jet openings 33. The clamps 7 of the jets 2 and the cases 6 of the jets 2 have a compatible thread and internal space 9. The cases 6 of the jets 2 have two positions—the working one, where the jet 2 is opened and pressed against the jet opening 33, and the closed one, where the jet 2 is pressed against the jet opening 33, but it is on the side of its discharge opening 25 blinded by the case 6. Each jet 2 is 38 mm long and has one longitudinally arranged through-going jet channel 22 with the diameter of 4 mm and four gas feeds 24 with the diameter of 3 mm positioned according to the rules of rotational symmetry, tilted with reference to the longitudinal axis 10 of the jet 2 by 45°, wherein the intersection 29 of their axes 28 is at the distance of 10 mm from the discharge opening 25 of the jet channel 22. The gas feeds 24 enter the jet channel 22 on one side and the internal space 9 of the clamp 7 of the jet 2 and that of the case 6 of the jet 2 on the other side. The cases 6 of the jets 2 are connected to the feed pipe 27, being air tubing that supply the system with air at the pressure of 0.6 MPa.

Example 2B A Fully Automatic Plastering Machine with the Jet Adapter

The smart plastering machine equipped with gauges and a monitoring device and fitted with the jet adapter 1 according to Example 2A is arranged at the wall using a remote control and the plastering machine is preset the required thickness of plaster (15 mm). The plastering machine will scan the wall to be plastered by gauges, analyse the situation and install itself in the most appropriate position with reference to the wall to be plastered. The bracket 3 in the holder 5 is set in the extreme position on one side and also in the lower working position. Considering the fact that the holder 5 is fitted with two wiping blades 4 positioned parallel to the bracket 3, where one wiping blade 4 is positioned under the bracket 3 and the other one above the bracket 3, the plastering machine will reposition the holder 5 to the lowest possible position where the lower wiping blade 4 touches the floor, and/or the lower edge of the plastered area. The lower wiping blade 4 is adjusted by the plastering machine at the required offset from the wall with reference to the planned thickness of plaster and at the optimal calculated slope that ranges between −60° and −10° with reference to the horizontal plane. The other one, upper wiping blade 4 is set off the wall at this moment and its slope does not matter. The plastering machine also monitors the development of the slope of the jets 2, which is controlled by the pistons positioned between the bracket 3 and the holder 5. The plastering machine activates the feed of gas pressurized at the pressure of 0.6 MPa to the system and the supply of material from the source—which may be a cistern fitted with a pump or mixing equipment with a pump—to the feed hose 35. The material is supplied by the feed hose 35 to the bracket 3 (35 l/min.), along which it is distributed to the jets 2; the material passes the jet channels 22 of the jets 2, is accelerated by the flowing pressurized air entering the gas channel 22 by the gas feeds 24 and leaves the jet 2 at the flow rate of 2.9 l/min. though one of the jets 2. At that moment, the movement of the holder 5 with the bracket 3 and the jets 2 is activated and it moves upwards to the ceiling at the speed of 12 mm/s, while continuously applying plaster onto the wall. The material is usually applied onto the wall from the floor towards the ceiling. Immediately after the application of material onto the wall, the material is wiped by the wiping blade 4, which moves on the holder 5 along with the bracket 3. The movement of the holder 5 is stopped in the highest working position of the plastering machine where the upper wiping blade 4 has reached an obstacle—usually the ceiling. Then the bracket 3, controlled by the piston automatically tilts and the jets 2 are tilted with reference to the upper edge of the plastered area. The supply of material is automatically deactivated and immediately then the feed of pressurized gas is deactivated too. In this way, the area of 1 $m^2$ of the wall is plastered and wiped within 165 s. Then the lower wiping blade 4 is either set off from the plastered area, and/or its slope is readjusted to +10° through +60° and the upper wiping blade 4 is pressed against the plastered area and its slope is also set at +10° through +60°. The plastering machine then moves with the holder 5 along the guide downwards at the same speed, i.e. 12 mm/s, while trowelling the plaster using the wiping blade(s). After the entire band of the applied plaster has been trowelled, the plastering machine moves the bracket 3 in the holder 5 to the opposite extreme side position and the entire process is repeated. After the other band of the plaster has been trowelled, the plastering machine is moved and the previous band is followed by the next one until the entire intended area has been plastered.

Example 3A The Jet Adapter Fully Equipped, for Example for Fully Automatic Plastering Machine The jet adapter 1 is fitted with a holder 5 with the bracket 3 mounted in a movable and dismountable manner. The length of the holder 5 is three times the length of that of the bracket 3 and it is fitted with a movable system for the bracket 3, which can move within the holder 5 from one side to the other. In addition, the holder 5 is fitted with two wiping blades 4 attached in a movable and dismountable manner, wherein the length of the wiping blades 4 is the same or smaller than that of the bracket 3 and the same or smaller than that of the holder 5. Between the bracket 3 and the holder 5 and also between the wiping blades 4 and the holder 5, guided pistons controlling the slope of the bracket 3, and/or the slope of the jets 2 and the slope of the wiping blades 4 are mounted. The bracket 3 has the diameter of 40 mm and the length of 500 mm and is fitted with two material supply openings 32 of the diameter of 15 mm and eight jet openings 33 with the diameters of 18 mm. Both the material supply openings 32 of the bracket 3 are connected to the feed hoses 35 with the internal diameter of 15 mm, which together supply material to the bracket 3 at the speed of 35 l/min. All jet openings 33 are fitted with jets 2. The jets 2 have the external diameter of 19 mm, mate with the jet openings 33 and are all fitted in a single plastic clamp 7 of the jets 2, which has the shape of individual clamps 7 combined together to make one piece, that can be put on the bracket 3 from the side, and secured by at least one screw, which keeps the jets 2 in place, and the jets 2 are also secured by eight cases 6 of the jets 2 fixing the jets 2 pressed against the jet openings 33. The clamp 7 of the jets 2 and the cases 6 of the jets 2 have a compatible thread and internal space 9. In the internal space 9, a spring 8 is located that presses the jet 2 against the case 6 of the jet 2 thus sealing the jet 2—case 6 of the jet 2 connection. Each jet 2 is 55 mm long and has one longitudinally arranged through-going jet channel 22 with the diameter of 8 mm and six gas feeds 24 with the diameter of 7 mm arranged in accordance with the rules or rotational symmetry tilted with reference to the longitudinal axis 10 of the jet by 60°, wherein the intersection 29 of their axes 28 is at the distance of 32 mm from the discharge opening 25 of the jet channel 22. The gas feeds 24 enter the jet channel 22 on one side and the internal space 9 of the clamp 7 of the jet 2 and that of the case 6 of the jet 2 on the other side. The cases 6 of the jets 2 are connected to the feed pipe 27, being air tubing that supply the system with air at the pressure of 0.8 MPa.

Example 3B A Fully Automatic Plastering Machine with the Jet Adapter and Blinded Jets The smart plastering machine equipped with gauges and a monitoring device and fitted with the jet adapter 1 according to Example 3A is arranged at the wall using a remote control and the plastering machine is preset the required thickness of plaster (10 mm). The plastering machine will scan the wall to be plastered by gauges, analyse the situation and install itself in the most appropriate position with reference to the wall to be plastered. The bracket 3 in the holder 5 is set in the extreme position on one side and in the lower working position. Considering the fact that the holder 5 is fitted with two wiping blades 4 positioned parallel to the bracket 3, where one wiping blade 4 is positioned under the bracket 3 and the other one above the bracket 3, the plastering machine will reposition the holder 5 to the lowest possible position where the lower wiping blade 4 touches the floor, and/or the lower edge of the plastered area. The lower wiping blade 4 is adjusted by the plastering machine at the required offset with reference to the planned thickness of plaster and at the optimal calculated slope that ranges between −60° and −10° with reference to the horizontal plane. The other one, upper wiping blade 4 is set off the wall at this moment and its slope does not matter. The plastering machine also monitors the development of the slope of the jets 2, which is controlled by the pistons positioned between the bracket 3 and the holder 5. The plastering machine activates the feed of pressurized gas by the supply pipe 27 at the pressure of 0.8 MPa to the system and the supply of material from the source—which may be a cistern fitted with a pump or mixing equipment with a pump—to the feed hose 35. The material is supplied by the feed hose 35 to the bracket 3 (35 l/min.), along which it is distributed to the jets 2; the material passes the jet channels 22 of the jets 2, is accelerated by the flowing pressurized air coming to the gas channel 22 by the gas feeds 24 and leaves the jet 2 at the flow rate of 4.3 l/min. per jet 2. At that moment, the movement of the holder 5 with the bracket 3 and the jets 2 is activated and it moves upwards to the ceiling at the speed of 25 mm/s, while continuously applying plaster onto the wall. Immediately after the application of material onto the wall, the material is wiped by the wiping blade 4, which moves on the holder 5 along with the bracket 3. The movement of the holder 5 is stopped in the highest working position of the plastering machine where the upper wiping blade 4 has reached an obstacle—usually the ceiling. Then the bracket 3, controlled by the piston automatically tilts and the jets 2 are tilted with reference to the upper edge of the plastered area. The supply of material is automatically deactivated and immediately then the feed of pressurized gas is deactivated too. In this way, the area of 1 $m^2$ of the wall is plastered and wiped within 80 s. Then the lower wiping blade 4 is either set off from the plastered area, and/or its slope is readjusted to +10° through +60° with reference to the horizontal plane and the upper wiping blade 4 is pressed against the plastered area and its slope is also set at +10° through +60° with reference to the horizontal plane. The plastering machine then moves with the holder 5 along the guide downwards at the same speed, i.e. 25 mm/s, while trowelling the plaster using the wiping blade(s) 4. After the entire band of the applied plaster has been trowelled, the plastering machine moves the bracket 3 within the holder 5 so that the newly applied band follows the already applied band of plaster and the entire process is repeated. After the other band of the applied plaster is has been trowelled, the plastering machine moves the bracket 3 in the holder to the opposite extreme side position. However, at this moment it is necessary to apply plaster onto a band narrower than the bracket 3. The two extreme side positions of the jet 2 are thus blinded by blinding pins that have the thickness of 7 mm and the length of 65 mm and are equipped with a thread or profiling. Via the case 6 of the jet 2, a blinding cap is fitted that has a thread and/or shape corresponding to the profiling of the blinding pin, thus locking the blinding pin in its place. The entire process of plaster application is repeated with the difference that the speed of material feeding is reduced to 25 l/min. After the third band of plaster has been trowelled, the plastering machine is moved to a different place by the remote control. If the wall to be plastered is significantly curved, the smart plastering machine also sets the seating of the wiping blades 4 to the plastered wall at an angle with respect to the plane of the wall thus reducing the wall curvature.

LIST OF MARKS FOR TERMS

1. Jet adapter
2. Nozzle
3. Bracket
4. Wiping blade
5. Bracket
6. Jet case 2
7. Jet clamp 2
8. Jet spring 2
9. Internal space of the clamp 7 and that of the case 6
10 Axis of the jet 2
21. Body of the jet 2
22. Jet channel of the jet 2
23. Edge of the jet 2
24. Gas feed to the jet channel 22
25. Discharge opening of the jet channel 22
26. Inlet opening of the jet channel 22
27. Feed pipe for the gas feeds 24
28. Axis of the gas feed 24
29. Intersection of the axes 28 of the gas feeds 24
31. Plug of the bracket 3
32. Material supply opening of the bracket 3
33. Jet opening of the bracket 3
34. Jet opening plug 33
35. Feed hose of the bracket 3
36. Axis of the bracket 3

APPLICABILITY IN INDUSTRY

A fast (semi)automatic plastering process for interior as well as exterior walls by the materials, such as plaster, heat insulation foams or penetrating agents.

The invention claimed is:

1. A jet adapter (1) for plastering machines characterized in that it comprises a closed cylindrical bracket (3) mounted on a holder (5), fitted with at least three jet openings (33), wherein each of the jet openings (33) are arranged in a single row along the bracket (3) in one axis such that the row is parallel to a longitudinal axis (36) of the bracket (3), wherein the at least three jet openings (33) are spaced at constant distances wherein each jet opening (33) is equipped with a plug or a jet, wherein the plug comprises a shape of a sleeve securable by a screw embracing the closed cylindrical bracket to close the jet opening, wherein the at least three jet openings (33) are fitted with jets, wherein an axis (10) of a jet (2) is perpendicular to the axis (36) of the bracket (3), the diameter of the jet opening (33) is smaller than an external diameter of the jet (2) and the jet (2) presses against the jet opening (33) by an edge (23) of the jet (2), the jet (2) comprises a jet channel (22), which passes along the entire length of the jet (2), and the jet (2) comprises at least two gas feeds (24) entering the jet channel (22) at a slope ranging from 20° to 60° with reference to the axis (10) of the jet (2), wherein an intersection (29) of axes (28) of the gas feeds (24) is situated in the jet channel (22) such that the gas feeds (24) open into the jet channel (22) at a maximum distance corresponding to four times a diameter of the jet channel (22) from the discharge opening (25) of the jet channel (22), and at a minimum distance corresponding to 1.5 times larger than the diameter of the jet channel (22) from the discharge opening (25) of the jet channel (22), and a length of the bracket (3) is at the maximum 30 times larger than its internal diameter.

2. The jet adapter (1) for plastering machines according to claim 1 characterized in that the jet channel (22) of the jet (2) has a circular cross-section.

3. The jet adapter (1) for plastering machines according to claim 1 characterized in that the jet channel (22) of the jet (2) has a constant diameter along its entire length.

4. The jet adapter (1) for plastering machines according to claim 1 characterized in that the jet's (2) length is at least 9 times larger than the diameter of the jet channel (22) in the place of the discharge opening (25).

5. The jet adapter (1) for plastering machines according to claim 1 characterized in that the jet (2) comprises at least three gas feeds (24) entering one jet channel (22) at a slope ranging from 40° to 50° with reference to the axis (10) of the jet (2).

6. The jet adapter (1) for plastering machines according to claim 1 characterized in that the intersection (29) of the axes (28) of the gas feeds (24) situated in the jet channel (22) offward the discharge opening (25) at a distance that is 2 to 3 times larger than the diameter of the jet channel (22) in the place of the discharge opening (25).

7. The jet adapter (1) for plastering machines according to claim 1 characterized in that the gas feeds (24) have circular cross-sections, and wherein the gas feeds (24) are connected to a feed pipe (27) of a pressurized gas.

8. The jet adapter (1) for plastering machines according to claim 7 characterized in that pressurized gas is supplied by the feed pipe (27) at pressure ranging from 0.3 to 0.8 MPa.

9. The jet adapter (1) for plastering machines according to claim 1 characterized in that the jet (2) is attached to the bracket (3) using a clamp (7) of the jet (2) and a case (6) of the jet (2), which are connected one to another by a dismountable connection.

10. The jet adapter (1) for plastering machines according to claim 9 characterized in that the dismountable connection is a sealed thread.

11. The jet adapter (1) for plastering machines according to claim 9 characterized in that the clamp (7) of the jet (2), the case (6) of the jet (2) and a cover of the jet (2) delimit an internal space (9), which interconnects the gas feeds (24) with the feed pipe (27).

12. The jet adapter (1) for plastering machines according to claim 1 characterized in that the bracket (3) is mounted in the holder (5) by a rotary mounting, wherein the rotary mounting of the bracket (3) is performed by at least two sliding connections.

13. The jet adapter (1) for plastering machines according to claim 12 characterized in that a rotation is provided around the axis (36) of the bracket (3), wherein the rotation is performed by a piston connecting of the bracket (3) and the holder (5).

14. The jet adapter (1) for plastering machines according to claim 12 characterized in that an axis connecting the jet openings (33) and a horizontal plane make an angle ranging from +0° to +60° and/or −0° to −60°, where a centre of the angle lies in the axis (36) of the bracket (3).

15. The jet adapter (1) for plastering machines according to claim 1 characterized in that it comprises at least one wiping blade (4) positioned parallel to the axis of the bracket (3) and fitted with a vibrator, wherein the at least one wiping blade (4) is tilted to allow plaster discharged from the jet adapter for plastering machines to be wiped and troweled.

16. The jet adapter (1) for plastering machines according to claim 15 characterized in that the wiping blade (4) is mounted in the holder (5) by a rotary mounting performed by at least two sliding connections.

17. The jet adapter (1) for plastering machines according to claim 16, characterized in that a rotation is provided around the axis connecting both sliding connections.

18. The jet adapter (1) for plastering machines according to claim 16 characterized in that a rotation is performed by a piston connecting of the wiping blade (4) and the holder (5).

19. The jet adapter (1) for plastering machines according to claim 16 characterized in that an axis connecting the wiping blade (4) and a horizontal plane make an angle ranging from +0° to +60° and/or −0° to −60°, where a centre of the angle lies in the axis connecting both sliding connections.

20. The jet adapter (1) for plastering machines according to claim 1, wherein the jet adapter (1) is installed on a movable base.

* * * * *